Figure 1:
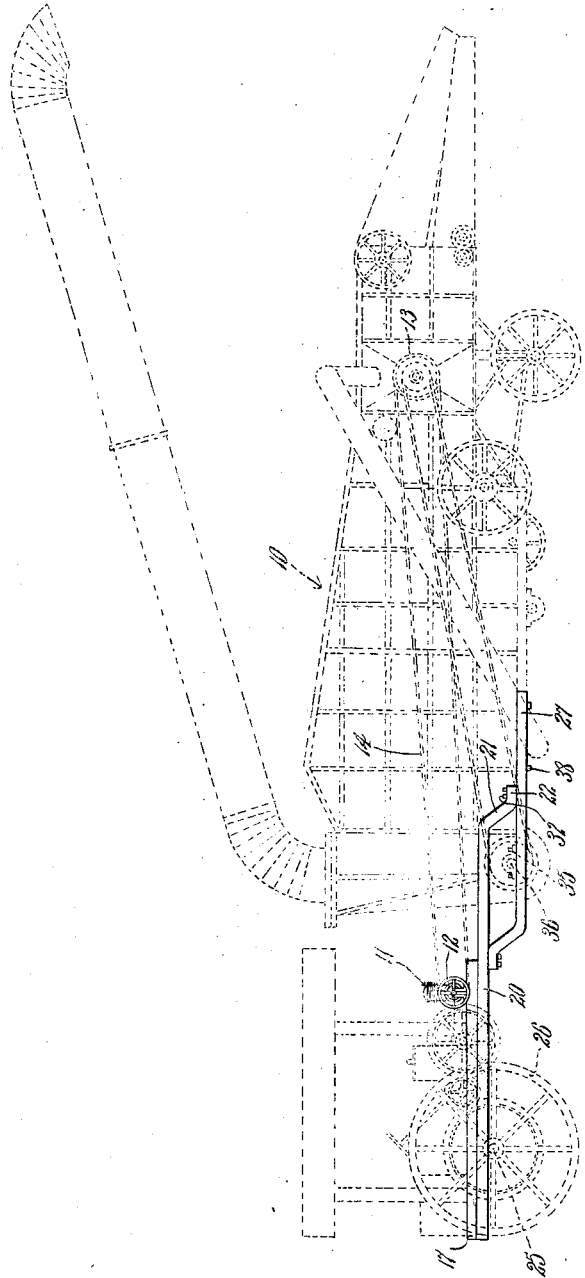

A. H. WARTCHOW.
TRACTION ATTACHMENT FOR IMPLEMENTS.
APPLICATION FILED MAY 6, 1909.

946,627.

Patented Jan. 18, 1910.
3 SHEETS—SHEET 1.

Inventor
Albert H. Wartchow,
By Chandler & Chandler
Attorneys

Witnesses
J. H. Crawford

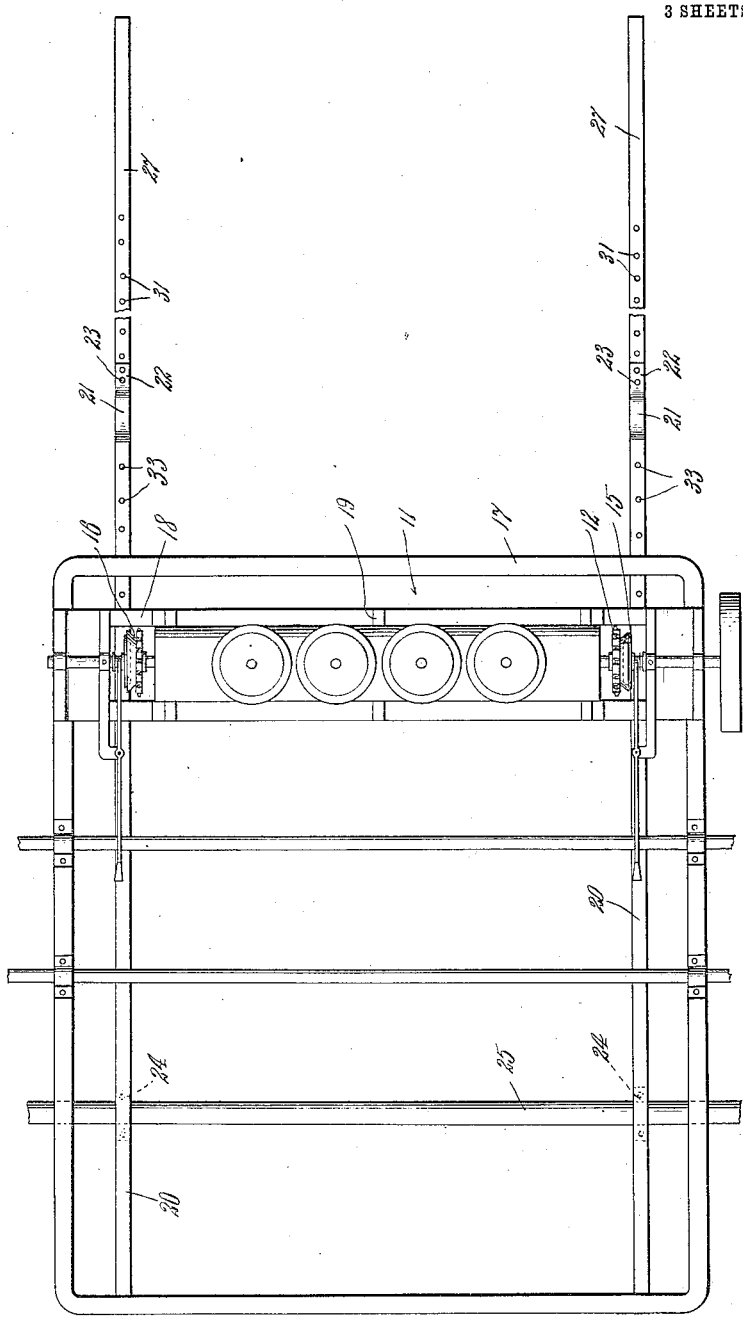

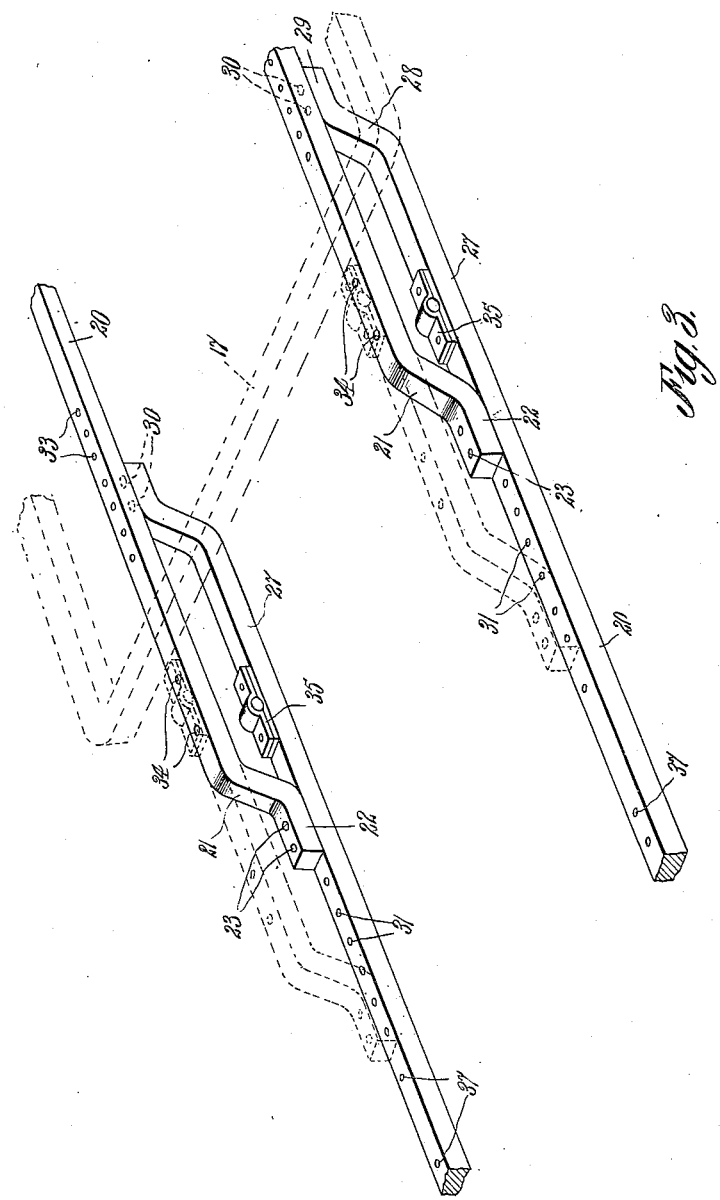

UNITED STATES PATENT OFFICE.

ALBERT H. WARTCHOW, OF DEERING, NORTH DAKOTA.

TRACTION ATTACHMENT FOR IMPLEMENTS.

946,627.  Specification of Letters Patent.  Patented Jan. 18, 1910.

Application filed May 6, 1909. Serial No. 494,389.

*To all whom it may concern:*

Be it known that I, ALBERT H. WARTCHOW, a citizen of the United States, residing at Deering, in the county of McHenry, State of North Dakota, have invented certain new and useful Improvements in Traction Attachments for Implements; and I do hereby declare the following to be a full, clear, and exact description of the invention, such as will enable others skilled in the art to which it appertains to make and use the same.

This invention relates to tractors for farm and other implements and has special reference to a novel form of means for applying a tractor to a farm or other implement.

One object of the present invention is to provide a novel means of attaching a tractor to an implement of the above described character.

Another object of the invention is to provide an adjustable means for supporting a tractor so that the same may be attached to a variety of shapes and sizes of implements of the above character.

A third object of the invention is to provide a novel form of supporting frame for use in connection with a tractor.

With the above and other objects in view the invention consists in general of a supporting frame for tractor elements provided with adjustable means for attaching the same to a farm or other implement.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—

Figure 1 is a side elevation showing the complete tractor as applied to a threshing machine. Fig. 2 is a detail top plan view of the tractor frame with the engine and other parts in dotted lines to show their positions thereon. Fig. 3 is a detail view showing the manner of adjusting the attachment to the implement.

The numeral 10 indicates a farm implement which is here shown as a threshing and stacking machine and this implement is to be taken as typical of any form of wheel mounted implement.

At 11 is indicated tractor mechanism which is here shown as comprising a gasolene engine with its gearing tank and tool box. Upon the shaft of the engine is mounted a belt wheel 12 which is connected to the belt wheel 13 of the implement by means of a suitable belt 14. This belt wheel 12 is provided with a clutch 15 so that the belt wheel may be thrown in or out as may be desired. The shaft of the engine is also provided with a clutch and gear 16 so that the propelling gear may also be thrown in or out when it is required to move or stop the engine.

The supporting frame comprises an upper rectangular frame 17 which is provided with cross members 18 having bolsters 19 thereon to support the engine. This frame 17 is fixedly attached to spaced frame bars 20 provided with downwardly bent extensions 21 having terminals 22 provided with bolt receiving apertures 23. Adjacent the other end of the frame members 20 is supported a pair of bearings 24 wherein is mounted an axle 25 provided with wheels 26 to support the outer end of the tractor.

Beneath the frame member 20 extend frame members 27 provided with upwardly inclined extensions 28 having terminals 29 provided with bolt receiving apertures 30. The members 27 are also provided with a series of spaced bolt receiving apertures 31 extending therethrough and adapted to receive the bolts 32 which pass through the bolt receiving apertures 23 of the frame members 20. The frame members 20 in like manner are provided with a series of bolt receiving apertures 33 which are adapted to receive the bolts which pass through the bolt receiving apertures 30 of the members 27. From an inspection of Fig. 1 it will be observed that this construction provides a very strong and rigid truss frame having rhomboidal central portions and rectilinear ends. The frame members 20 and 27 are provided on the upper and lower sides of the rhomboidal portions with bolt receiving apertures 34 and bearings 35 are attached to the frame by these bolt receiving apertures. It will be obvious that this construction permits the bearings to be placed above or below either of the frame members so that the bearings may be located at varying heights with reference to the frame 17. These bearings are so arranged that they may receive the rear axle 36 of the implement and to this end the wheels of said implement which are located on that axle are removed. Suitable bolt holes 37 are also provided in the frame members 27 for the purpose of receiving bolts 38 for attaching the frame members 27 to an implement. By means of this peculiar construction the ordinary four wheeled implement is provided with tractor means so arranged that the implement and tractor are supported on but four wheels thus making it very easy to turn the implement as there is no rigid wheel base as would be the case were the rear wheels of the implement allowed to remain in position.

There has thus been provided a simple and efficient device of the kind described and for the purpose specified and one which by means of the various series of bolt holes and attachments may be adjusted to fit any height of implement and may be brought nearer or further from such an implement.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a device of the kind described, opposed rhomboidal tractor frames, and means for varying the length of said frames.

2. In a device of the kind described, opposed rhomboidal tractor frames each comprising an upper side member having a rigid end member thereon and provided with a series of bolt receiving apertures in the side member, and a similar bottom, side and end member similarly provided, the extremities of each of the end members being provided with bolt receiving apertures adapted to register with the bolt receiving apertures of the other side member, and bolts passing through said apertures.

3. In a device of the kind described, the combination with an implement axle; of opposed rhomboidal tractor frames, means for varying the length of said frames, and bearings attachable above or below either of the side members of said rhomboidal frames.

4. In a device of the kind described, opposed rhomboidal tractor frames each comprising an upper side member having a rigid end member thereon and provided with a series of bolt receiving apertures in the side member, a similar bottom, side and end member similarly provided, the extremities of each of the end members being provided with bolt receiving apertures adapted to register with the bolt receiving apertures of the other side member, bolts passing through said apertures; in combination with an implement axle, and bearings attachable above or below either of the side members of said rhomboidal frames and arranged to receive said implement axle.

5. In a device of the kind described, opposed rhomboidal tractor frames, means for varying the length of said frames, and an engine supporting frame carried on said tractor frames.

6. In a device of the kind described, the combination with an implement axle; of opposed rhomboidal tractor frames, means for varying the length of said frames, bearings attachable above or below either of the side members of said rhomboidal frames and arranged to receive said axle, and an engine supporting frame carried on said tractor frames.

7. In a device of the kind described, the combination with an implement axle; of opposed rhomboidal tractor frames each comprising an upper side member having a rigid end member thereon and provided with a series of bolt receiving apertures in the side member, and a similar bottom, side and end member similarly provided, the extremities of each of the end members being provided with bolt receiving apertures adapted to register with the bolt receiving apertures of the other side member, bolts passing through said apertures, an engine supporting frame carried on said tractor frames, and bearings attachable above or below either of the said members of said rhomboidal frames and arranged to receive said axle.

In testimony whereof, I affix my signature, in presence of two witnesses.

ALBERT H. WARTCHOW.

Witnesses:
W. W. WEDGE,
R. F. WEIGEL.